(12) United States Patent
Axrup et al.

(10) Patent No.: US 9,994,999 B2
(45) Date of Patent: Jun. 12, 2018

(54) PAPER OR PAPERBOARD SUBSTRATE, A PROCESS FOR PRODUCTION OF THE SUBSTRATE AND A PACKAGE FORMED OF THE SUBSTRATE

(75) Inventors: Lars Axrup, Hammaro (SE); Isto Heiskanen, Imatra (FI); Kaj Backfolk, Lappeenranta (FI)

(73) Assignee: STORA ENSO OYJ, Helsinki (FI)

( * ) Notice: Subject to any disclaimer, the term of this patent is extended or adjusted under 35 U.S.C. 154(b) by 64 days.

(21) Appl. No.: 13/512,725

(22) PCT Filed: Dec. 20, 2010

(86) PCT No.: PCT/SE2010/051422
§ 371 (c)(1),
(2), (4) Date: May 30, 2012

(87) PCT Pub. No.: WO2011/078770
PCT Pub. Date: Jun. 30, 2011

(65) Prior Publication Data
US 2012/0251818 A1    Oct. 4, 2012

(30) Foreign Application Priority Data
Dec. 21, 2009  (SE) ...................................... 0950995

(51) Int. Cl.
| | |
|---|---|
| *D21H 11/18* | (2006.01) |
| *D21H 27/10* | (2006.01) |
| *D21H 19/34* | (2006.01) |
| *B65D 65/42* | (2006.01) |
| *B32B 27/32* | (2006.01) |
| *B32B 27/10* | (2006.01) |
| *B32B 29/00* | (2006.01) |

(52) U.S. Cl.
CPC ............ *D21H 11/18* (2013.01); *B32B 27/10* (2013.01); *B32B 27/32* (2013.01); *B32B 29/00* (2013.01); *B65D 65/42* (2013.01); *D21H 19/34* (2013.01); *D21H 27/10* (2013.01); *Y10T 156/10* (2015.01); *Y10T 428/253* (2015.01)

(58) Field of Classification Search
CPC ........ D21H 11/18; D21H 27/10; D21H 19/34; B65D 65/42; B32B 27/10; B32B 29/00; B32B 27/32
See application file for complete search history.

(56) References Cited

U.S. PATENT DOCUMENTS

| | | | | |
|---|---|---|---|---|
| 4,890,439 | A * | 1/1990 | Smart ............................... | 53/410 |
| 4,900,594 | A * | 2/1990 | Quick et al. .................. | 428/34.2 |
| 6,068,897 | A * | 5/2000 | Adur et al. .................... | 428/34.2 |
| 6,183,596 | B1 | 2/2001 | Matsuda et al. | |
| 8,002,170 | B2 * | 8/2011 | Dixon-Garrett et al. .... | 229/5.84 |
| 2007/0298196 | A1 * | 12/2007 | Petersen ................... | B32B 7/10 |
| | | | | 428/34.2 |
| 2008/0173419 | A1 * | 7/2008 | Sumnicht ...................... | 162/146 |
| 2009/0324861 | A1 * | 12/2009 | Penttinen ................ | B32B 27/30 |
| | | | | 428/34.8 |

FOREIGN PATENT DOCUMENTS

| | | |
|---|---|---|
| EP | 2267222 A1 | 12/2010 |
| JP | 2000303386 A | 10/2000 |
| WO | 9723390 | 7/1997 |
| WO | 2007091942 | 8/2007 |
| WO | 2008076056 | 6/2008 |
| WO | 2009122982 A1 | 10/2009 |
| WO | 2009153225 | 12/2009 |

OTHER PUBLICATIONS

Minelli"Investigation of mass transport properties of microfibrillated cellulose (MFC) films," Journal of Membrane Science 358 (2010) 67-75.*
"Review of Recent Research into Cellulosic Whiskers, Their Properties and Their Application in Nanocomposite Field," My Ahmed Said Azizi Samir, Fannie Alloin,‡ and Alain Dufresne, Biomacromolecules 2005, 6, 612-626.*
"Microfibrillated cellulose—Its barrier properties and applications in cellulosic materials: A review," Nathalie Lavoine, Isabelle Desloges, Alain Dufresne, Julien Bras; Carbohydrate Polymers 90 (2012) 735-764.*
"Microfibrillated cellulose and new nanocomposite materials: a review," Istva'n Siro & David Plackett,Cellulose (2010) 17:459-494.*
Jamieson, E.H. "Structure and oxygen-barrier properties of metallized polymer film" Journal of Materials Science 18 (1983) 64-80.*
International Search Report and Written Opinion of the International Searching Authority (PCT/SE2010/051422), dated Apr. 4, 2011.
Syverud et al, "Strength and barrier properties of MFC films." In: Cellulose (2009), vol. 16, No. 1, pp. 75-85.
Aulin, C. et al. "Oxygen and oil barrier properties of microfibrillated cellulose films and coatings." Cellulose, 2010, vol. 17, pp. 559-574.
Hult, Eva-Lena et al. "Efficient approach to high barrier packaging using microfibrillar cellulose and shellac." Cellulose, 2010, vol. 17, pp. 575-589.
Fukuzumi, H. et al. "Transparent and High Gas Barrier Films of Cellulose Nanofibers Prepared by TEMPO-Mediated Oxidation." Biomacromolecules, 2009, vol. 10, pp. 162-165.
Opposition filed in corresponding Swedish Application No. 0950995-1, mailed Nov. 21, 2012.

* cited by examiner

*Primary Examiner* — Kevin R Kruer
(74) *Attorney, Agent, or Firm* — Greer, Burns & Crain, Ltd.

(57) ABSTRACT

The present invention relates to a paper or paperboard substrate having barrier properties which substrate comprises a first fiber based layer, a second layer comprising micro-fibrillated cellulose, a third layer comprising a heat sealable polymer, and a fourth layer comprising aluminum, aluminum oxide or titanium dioxide. The invention further relates to a process for the production of said substrate and a package formed of said substrate.

18 Claims, No Drawings

PAPER OR PAPERBOARD SUBSTRATE, A PROCESS FOR PRODUCTION OF THE SUBSTRATE AND A PACKAGE FORMED OF THE SUBSTRATE

This application is a U.S. National Phase under 35 U.S.C. § 371 of International Application No. PCT/SE2010/051422, filed Dec. 20, 2010, which claims priority under 35 U.S.C. §§ 119 and 365 to Swedish Application No. 0950995-1, filed Dec. 21, 2009.

FIELD OF THE INVENTION

The present invention relates to a paper or paperboard substrate having barrier properties. The invention further relates to a process for the production of said substrate and package formed of the substrate.

BACKGROUND

Fiber based products used as packages must both be able to protect the packed product from outer influences as well as withstand the influence of the packed product. One way to achieve the desired protection is to provide the package with a barrier.

In the case of perishable products, such as oxygen sensitive products, oxygen barrier characteristics of the package are required to provide extended shelf life for the packaged product. By limiting the exposure of oxygen-sensitive products to oxygen, the quality and shelf life of many products are maintained and enhanced. For instance, by limiting the oxygen exposure of oxygen-sensitive food products in a packaging system, the quality of the food product can be maintained and spoilage retarded. In addition, such packaging also keeps the product in inventory longer, thereby reducing costs incurred from waste and having to restock.

Barriers against for example liquids and/or grease can be used in order to increase the package's resistance of the packed product.

Barriers are normally created by coating the fiber based substrate with a composition which gives the substrate barrier properties. Different coatings can be applied depending on the needed properties of the barrier. The most commonly used materials when forming a barrier on a fiber based product, are polyethylene (PE), polypropylene (PP), polyethylene terephthalate (PET), ethylene vinyl alcohol (EVOH) or ethylene vinyl acetate (EVA). EVOH is normally used in order to create oxygen barriers and PE or PET is normally used in order to create a liquid and/or vapor barrier. The polymers are normally either laminated or extrusion coated to the fiber based product.

However, the thickness of a polymer layer which gives a product barrier properties normally need to be very thick and it is quite costly to produce such barrier product.

Another commonly used material in order to produce a barrier is aluminum. A layer comprising aluminum is above all used in order to improve the oxygen and light barrier of a paper or paperboard product. The thickness of an aluminum layers is normally quite thin, often around 7-9 µm. Aluminum gives excellent barrier properties but it strongly increases the carbon dioxide load of the product. Furthermore, aluminum decreases the possibility to recycle the package. There is therefore a demand from both producers and end users to avoid the use of aluminum layers in paper or paperboard products in order to decrease the carbon dioxide load of a product.

There is still a need for an improved fiber based product with barrier properties which is both more economical beneficial to produce and which can be produced at a low carbon dioxide load.

SUMMARY OF THE INVENTION

It is an object of the present invention to provide an improved fiber based substrate with barrier properties.

This object and other advantages are achieved by the substrate according to claim 1. The present invention relates to a paper or paperboard substrate having barrier properties which substrate comprises a first fiber based layer, a second layer comprising microfibrillated cellulose and a third layer comprising a polymer. It has been shown that the combination of a layer comprising microfibrillated cellulose and a polymer layer gives excellent barrier properties of the paper or paperboard substrate.

The second layer of the substrate is preferably attached to the first layer and the third layer is preferably attached to the second layer of the paper or paperboard substrate. In this way, the paper or paperboard substrate comprises three layers and the second layer comprising microfibrillated cellulose is located in between the first fiber based layer and the third polymer layer.

The polymer of the third layer of the substrate is preferably polyethylene or polyethylene terephthalate. These polymers will give the paper or paperboard substrate both heat-sealing properties as well as, together with the second layer comprising microfibrillated cellulose, the desired barrier properties.

The substrate may further comprise a fourth layer which is added by the aid of atomic layer deposition (ALD). The fourth layer is preferably located in between the second and the third layer. It is preferred that the fourth layer comprises aluminum.

The substrate preferably comprises a barrier against liquids, vapor, grease, detergents, oxygen and/or other gases.

The present invention further relates to a process for the production of a paper or paperboard substrate which substrate has barrier properties, wherein the process comprises the steps of providing a first fiber based layer, adding a second layer comprising microfibrillated cellulose and adding a third layer comprising a polymer.

The second layer is preferably added to the first layer by coating and the third layer is preferably added to the second layer by lamination or extrusion coating.

The process may also comprise the addition of a fourth layer to the substrate. It is preferred that the forth layer is added by use of atomic layer deposition (ALD). The fourth layer is preferably added in between the second and the third layers of the substrate.

The invention further relates to a package produced from the paper or paperboard substrate mentioned above wherein the package is used as a food or liquid package.

DETAILED DESCRIPTION

The present invention relates to a paper or paperboard substrate having barrier properties which substrate besides a first fiber based layer also comprises a second layer comprising microfibrillated cellulose (MFC) and a third layer comprising a polymer. It has been shown that the combination of a layer comprising microfibrillated cellulose and a polymer layer gives excellent barrier properties of the paper or paperboard product.

The addition of a layer comprising microfibrillated cellulose to a first fiber based layer makes the surface of the first fiber based layer more dense, i.e. the small size of the microfibrillated cellulose makes it possible for the MFC to cover the spaces between the fibers of the surface of the first fiber based layer which both denses and smoothens the surface. The densification and the improved smoothness improves the adhesion of a third layer comprising polymer, which increases the smoothness of the polymer layer which results in that less pin holes or other irregularities of the polymer layer, especially during extrusion coating, will arise. Furthermore, the addition of microfibrillated cellulose increases the surface energy of the surface of the paper or paperboard substrate. Increased surface energy increases the ability of the third layer comprising polymer to adhere to the surface. It may thus not be necessary to treat the paper or paperboard substrate comprising the second layer comprising MFC with, for example, a corona treatment, in order for the third layer comprising polymer to adhere. Since both the adhesion of the polymer layer and the smoothness of the surface is improved, the amount of polymer, i.e. the thickness of the third layer comprising polymer, may be decreased. The second layer comprising microfibrillated cellulose may be added in an amount of 0.1-10 g/m2 (as dry) preferably in the range of 0.5-3 g/m2 (as dry). Higher thickness of the layer comprising MFC results in that the elastic modulus of the surface of the paper or paperboard substrate improves, and higher bending stiffness index is thus also achieved. The thickness of the third layer comprising a polymer may be 5-50 gsm, preferably between 9-25 gsm. However, the thickness depends on the desired final properties of the paper or paperboard substrate.

The combination of the third layer comprising polymer and the second layer comprising MFC has surprisingly been shown to give excellent oxygen barrier properties. The combination of the densification of the surface of the first fiber based layer and the resistance which the polymer layer gives, results in a paper or paperboard substrate with very good oxygen barrier properties, even though each layer per se shows poor oxygen barrier properties. Furthermore, the substrate also shows good barrier properties against liquids and/or vapor which is are a result of the third layer comprising a polymer. It is preferred that the third layer which comprises a polymer also gives the paper or paperboard substrate heat-sealing properties, i.e. that it is a heat-sealing polymer which makes it easy to form a package from the produced paper or paperboard substrate. Furthermore, the addition of MFC and a polymer layer to the substrate increases the flexibility and thus also the strength during creasing and folding of the paper or paperboard substrate.

It is also possible to modify the microfibrillated cellulose of the second layer before addition to the first fiber based layer. In this way it is possible to for example further increase the surface energy or alter the charge of the surfaces of the MFC in order to improve the barrier properties as well as the adhesion of the third polymer layer. How the modification is done depends on the desired properties of the end product.

Microfibrillated cellulose (MFC) (also known as nanocellulose) is a material made from wood cellulose fibers, where the individual microfibrils have been partly or totally detached from each other. MFC is normally very thin (~20 nm) and the length is often between 100 nm to 10 µm. However, the microfibrils may also be longer, for example between 10-100 µm but lengths up to 200 µm can also be used. Fibers that has been fibrillated and which have microfibrils on the surface and microfibrils that are separated and located in a water phase of a slurry are included in the definition MFC.

MFC can be produced in a number of different ways. It is possible to mechanically treat cellulosic fibers so that microfibrils are formed. The production of nanocellulose or microfibrillated cellulose with bacteria is another option. It is also possible to produce microfibrils from cellulose by the aid of different chemicals and/or enzymes which will break or dissolve the fibers.

One example of production of MFC is shown in WO2007091942 which describes production of MFC by the aid of refining in combination with addition of an enzyme.

It is preferred that the third layer comprises any of the following polymers; polyethylene (PE), polyethylene terephthalate (PET), polyvinyl alcohol (PVOH), polyvinyl acetate (PVA), polypropylene (PP) and/or polyamide (PA). The polymer will preferably give the substrate heat-sealing properties which will improve the sealing of a package formed by the produced paper or paperboard substrate. Furthermore, these mentioned polymers will give the substrate increased barrier properties against liquids and/or vapor. However, these polymers per se will only give the substrate very little or even no resistance against gases, such as oxygen.

The paper or paperboard substrate according to the invention has barrier properties which gives the substrate improved resistance against for example, liquids, vapor, grease, detergents, oxygen or other gases. The substrate according to the invention has been shown to have improved resistance against both oxygen and vapor. The substrate may thus be suitable for use as both food and/or liquid packages.

The substrate may further comprise a fourth layer which may be added by the aid of atomic layer deposition (ALD). ALD is a well known technique for depositing thin films on a surface. ALD is based on the sequential use of a gas phase chemical process. It is common to use two chemicals, typically called precursors which react with a surface one-at-a-time in a sequential manner. By exposing the precursors to the growth surface repeatedly, a thin film is deposited. In order for ALD to work properly it is necessary that the surface in which the layer is added to is very smooth. The addition of the second layer comprising microfibrillated cellulose results in increased smoothness of the surface and it is thus possible to use ALD in order to form a thin layer of the layer comprising microfibrillate cellulose.

The fourth layer may be located in between the second and the third layers. It is preferred that the fourth layer comprises aluminum but other components can also be used, for example titanium dioxide which also will increases the opacity of the paper or paperboard substrate. In this way, it is thus possible to produce a very thin layer of for example aluminum oxide, preferably in the form of $Al_2O_3$, to the paper or paperboard substrate. The aluminum oxide layer gives the paper or paperboard substrate even further improved oxygen as well as vapor resistance properties which is necessary for some products. The thickness of the fourth layer is preferably in the range of 0.1-100 nm. The possibility to decrease the thickness of the aluminum layer will strongly decrease the carbon dioxide load of the substrate but still produce a paper or paperboard substrate with superior barrier properties.

The present invention further relates to a process for the production of a paper or paperboard substrate which substrate has barrier properties, wherein the process comprises the steps of providing a first fiber based layer, adding a second layer comprising microfibrillated cellulose and adding a third layer comprising a polymer. The second layer is preferably added to the first layer and the third layer is preferably added to the second layer.

It is preferred that the layer comprising MFC is coated, preferably wet coated, to the fiber based layer by any conventional coating technique. However, it is preferred to use film press or size press coating but other coatings techniques such as curtain coating, rod coating, spray coating, blade coating or dry coating can also be used. It is also possible to add the second layer comprising MFC as a film to the first fiber based layer. The film comprising MFC is then either laminated or extrusion coated onto the first layer.

The first fiber based layer may be coated with conventional coating color which preferably comprises minerals, such as clay, calcium carbonate or any other known coatings, before or after the second layer comprising MFC is added. The coating with conventional coating color can be done by any known coating technique.

The third layer comprising polymer is preferably added as a film to the paper or paperboard substrate. The film may be laminated or extrusion coated to the paper or paperboard substrate.

A fourth layer may also be added to the substrate. It is preferred that the forth layer is added by the use of atomic layer deposition (ALD). The fourth layer is preferably added in between the second and the third layers of the substrate.

It may also be possible to add additional layers to the paper or paperboard substrate. For example, an additional polymer layer, a fifth layer, can be added onto the third polymer layer. Another possibility is that a layer of ethylene vinyl alcohol (EVOH) will be added to the substrate between the second and third layer. This EVOH layer will preferably be thin. In this way, a substrate with increased barrier properties against oxygen will be produced.

The invention also relates to a package which is formed by creasing and folding the produced paper or paperboard substrate. The package will have excellent resistance against liquids, vapor and oxygen and will thus be suitable for forming a package for packaging foods and/or liquids.

As used herein, "polymer" may be used to refer to homopolymers, copolymers, interpolymers, terpolymers etc.

The first fiber based layer may comprise any kind of cellulosic fibers, such as hardwood or softwood fibers which may be chemically, chemi-mechanically and/or mechanically treated. The first layer may also comprise common papermaking additives, such as fillers to increase for example runnability and cost-efficiency of the process and the produced substrate.

The addition of the second, third and/or fourth layer can either be done on-line in the paper or board machine or be done off-line.

The other surface of the first fiber based layer, i.e. the surface which is not coated with a layer comprising MFC, may be coated with any suitable coating or treated in any suitable way in order to achieve good surface properties, especially good printing properties since this surface often will be the outer surface of a formed package.

The substrate is preferably a paper or board product. However, other products such as textiles, plastics etc can also be used.

Example

Sheets of Cupforma Classic 230 gsm, which is a bleached SBS cup board comprising three layers of bleached sulphate pulp was used as a fiber based layer.

One sheet was coated on the topside with two layers of microfibrillated cellulose using a laboratory rod coater. The total amount of MFC coated onto the paperboard was 1.2 gsm (as dry).

MFC was prepared from fully bleached sulphite softwood pulp with high cellulose content which were carboxymethylated to a DS of 0.05 to 0.1 and then fluidized (Microfluidizer, Microfuidics corp.) by letting pulp of 3% consistency pass through a 400 μm chamber followed by a 100 μm chamber wherein the MFC used were formed.

The paperboard sheets, both coated with MFC and the one which is untreated, were thereafter laminated with totally 24 gsm PE (11+13 gsm. Melt temp 311/292° C. Speed 310 m/min Borealis CA 7230) on the top side in a full scale laminator by attaching the sheets to the web.

The oxygen transmission rate were thereafter measured according to ASTM D3985-05 standard for both the sheet which was laminated with PE and sheet which was coated with MFC and laminated with PE according to the invention.

TABLE 1

Results of OTR

| | OTR ml/m2 24 h |
|---|---|
| Reference (Board + PE) | 3250 |
| Board + MFC + PE | 45 |

As can be seen from table 1, the oxygen transmission rate strongly decreases which shows that the combination of coating with MFC and PE results in a paperboard substrate with very good oxygen barrier properties.

The invention claimed is:

1. A paper or paperboard substrate having barrier properties which substrate comprises
    a first fiber based layer,
    a second layer coated or laminated over the first layer, the second layer comprising microfibrillated cellulose having a length between 10 nm and 10 μm, the second layer being applied in an amount of 0.1-10 g/m² (dry),
    a fourth layer deposited over the second layer, the fourth layer comprising aluminum, aluminum oxide, or titanium dioxide and having a thickness in the range of 0.1-100 nm, and
    a heat sealable third layer added over the fourth layer consisting of a polymer selected from polyethylene, polyvinyl alcohol, polyvinyl acetate, and polyamide, the third layer applied in an amount of 5-50 g/m².

2. The substrate according to claim 1 wherein an oxygen transmission rate of the substrate is 45 ml/m² 24 hr.

3. The substrate according to claim 1 wherein the third layer is added in an amount of 9-25 g/m².

4. The substrate of claim 1 wherein the second layer is applied in the amount of 0.5-3 g/m² (dry).

5. The substrate of claim 1 further comprising a layer of ethylene vinyl alcohol between the second layer and the third layer.

6. The substrate of claim 1 further comprising a coating on the opposite side of the first fiber based layer from the second layer.

7. The substrate according to claim 1 wherein the substrate is a barrier against liquids, vapor, grease, detergents, oxygen or other gases.

8. The substrate according to claim 1 wherein the fourth layer is deposited using atomic layer deposition.

9. The substrate according to claim 8 wherein the fourth layer comprises aluminum.

10. A package produced from the paper or paperboard substrate according to claim 1 wherein the package is used as a food or liquid package.

11. A process for the production of a paper or paperboard substrate which has barrier properties, wherein the process comprises the steps of;
providing a first fiber based layer,
adding a second layer over the first fiber based layer, the second layer comprising microfibrillated cellulose having a length between 10 nm and 10 μm, the second layer being added in an amount of 0.1-10 g/m² (dry), wherein adding the second layer over the first fiber based layer comprises coating the second layer over the first fiber based layer, or laminating or extrusion coating a film comprising the microfibrillated cellulose over the first fiber based layer,
depositing a fourth layer over the second layer, the fourth layer comprising aluminum, aluminum oxide, or titanium dioxide and having a thickness in the range of 0.1-100 nm,
adding a heat sealable third layer over the fourth layer, the third layer consisting of a polymer selected from polyethylene, polyvinyl alcohol, polyvinyl acetate, and polyamide, the third layer applied in an amount of 5-50 g/m².

12. The process according to claim 11 wherein an oxygen transmission rate of the substrate is 45 ml/m² 24 hr.

13. The process according to claim 11 wherein the third layer is added in an amount of 9-25 g/m².

14. The process of claim 11 wherein the second layer is applied in the amount of 0.5-3 g/m² (dry).

15. The process of claim 11 further comprising adding a layer of ethylene vinyl alcohol between the second layer and the third layer.

16. The process of claim 11 further comprising adding a coating on the opposite side of the first fiber based layer from the second layer.

17. The process according to claim 11 wherein the second layer is added to the first layer by coating and the third layer is added over the fourth layer by extrusion coating.

18. The process according to claim 11 wherein the fourth layer is deposited by atomic layer deposition (ALD).

* * * * *